ns Patent Office
3,519,956
Patented July 7, 1970

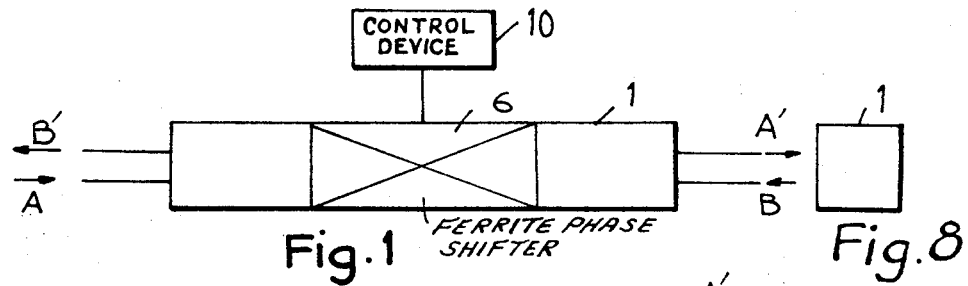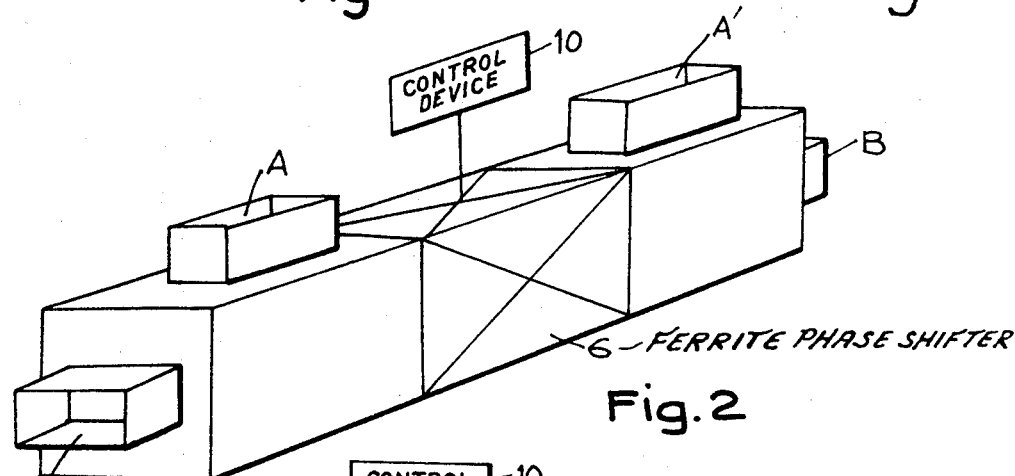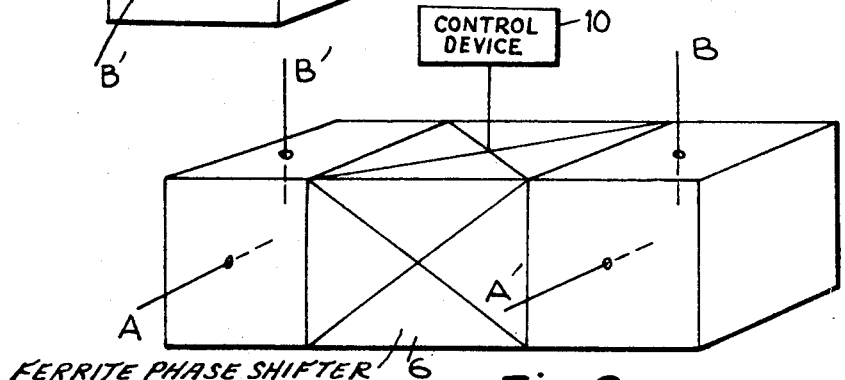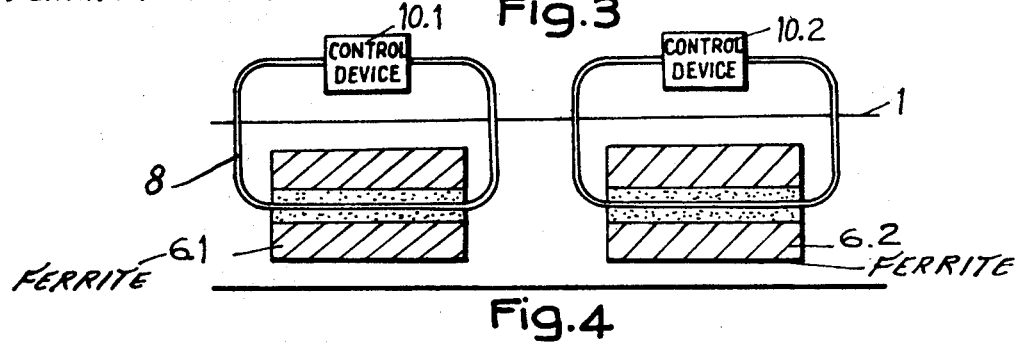

3,519,956
NONRECIPROCAL FERRITE PHASE-SHIFTER FOR SIMULTANEOUSLY PHASE SHIFTING $TE_{01}$ AND $TE_{10}$ MODES IN OPPOSITE DIRECTIONS
Thai Ngo Hai and Henri-Francois Bernadet, Paris, France, assignors to CSF-Compagnie Generale de Telegraphie Sans Fil, a corporation of France
Filed Mar. 14, 1968, Ser. No. 713,091
Claims priority, application France, Mar. 20, 1967, 99,511
Int. Cl. H01p 1/32; H03h 7/20
U.S. Cl. 333—1.1                                          7 Claims

ABSTRACT OF THE DISCLOSURE

In order to phase-shift simultaneously two ultra-high frequency waves of same nature by opposite phase-shift values, a ferrite phase-shifter is inserted in a square section waveguide portion and couplings are provided at the ends of the guide portion respectively for waves polarized in the $TE_{01}$ mode and for waves polarized in the $TE_{10}$ mode.

---

The present invention relates to phase-shifters with electronic control.

More particularly it is an object of the invention to provide a phase-shifter permitting the simultaneous phase-shifting, by amounts equal in absolute value and of opposite signs, of two electromagnetic waves propagating in opposite directions through the phase-shifter.

Such a phase-shifter is of particular interest for antenna systems with electronic scanning, because it enables the number of phase-shifter elements required to be reduced by 50%.

The use of ferrite or garnet phase-shift arrangements, which impose on electromagnetic wave propagating therethrough a phase-shift which is equal to $+\varphi$ or to $-\varphi$, to within a constant, according to the sense of propagation, is known in rectangular waveguides. Such phase-shifters cannot be used simultaneously for two waves with identical characteristics, because these would have to propagate in the same mode, and there would be problems in connection with the separation of the waves.

According to the invention there is provided a phase-shifter comprising a square waveguide having two end portions and two pairs of opposed lateral walls; at each of said end portions first coupling means for waves polarized normally to one pair of opposed lateral walls of said guide and second coupling means for waves polarized normally to the other pair of opposed lateral walls; and controllable phase-shifter means inserted in said guide.

For a better understanding of the invention and to show how the same may be carried into effect reference will be made to the drawings accompanying the following description and in which:

FIG. 1 is a basic diagram of the invention;

FIGS. 2 and 3 show diagrammatically and in perspective two embodiments of phase-shifters according to the invention;

Figure 5:
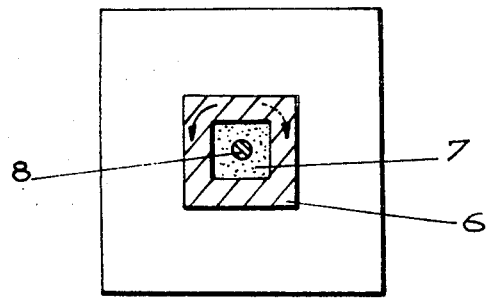
Figure 6:
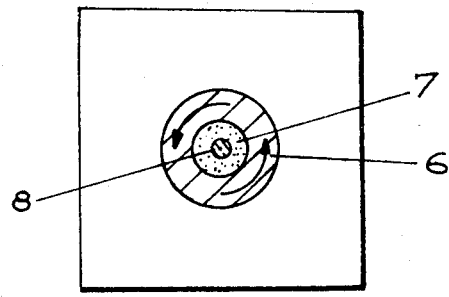
Figure 7:
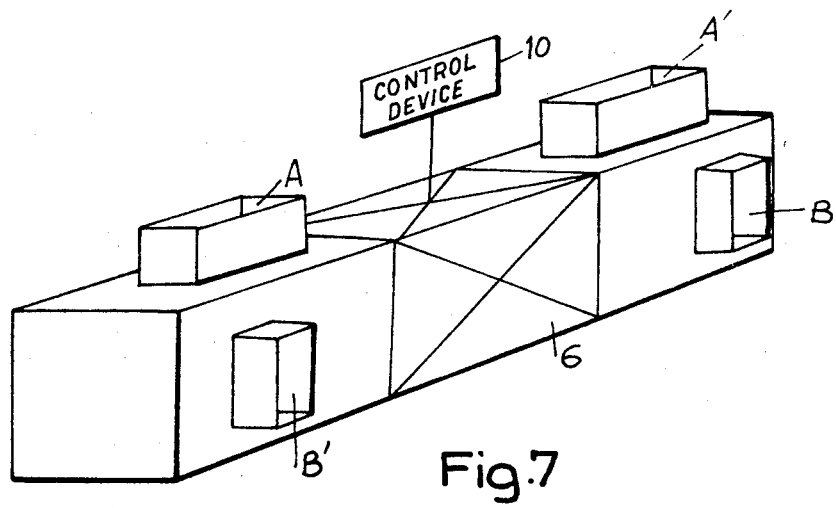

FIGS. 4, 5, and 6 show details of a phase-shifter according to the invention;

FIG. 7 shows diagrammatically a modification of the phase-shifter illustrated in FIG. 2; and FIG. 8 shows a cross section of an element of FIG. 1.

The bidirectional phase-shifter according to the invention shown in FIG. 1, essentially comprises a waveguide 1 with square cross-section, a ferrite or garnet phase-shifter 6 of known type, located within guide 6, and its associated control device 10. The ends of guide 6 are provided with respective pairs of couplings A', B and B' A. Wave propagation is from coupling A to coupling A' and from coupling B to coupling B', as indicated by arrows in FIG. 1, or conversely from A' to A and from B' to B, i.e. in opposite directions. Couplings A, A' are adapted for wave propagation in the guide 1 in the mode $TE_{01}$ and couplings B, B' for the wave propagation in the mode $TE_{10}$, or vice-versa.

In a first preferred embodiment shown in FIG. 2, the couplings are realized by means of waveguides opening into the guide 1. The couplings A, B' and A', B are windows respectively formed in the end walls of the guide, and in a wall perpendicular thereto and to which rectangular waveguides, adapted for the operation in one mode, e.g., $TE_{01}$ or $TE_{10}$ mode are fitted. Since the input windows, for example, windows A and B, are supplied in a similar manner but are formed in walls perpendicular to each other, they create in the guide 1, which has a square cross-section, crossed $TE_{01}$ and $TE_{10}$ waves which are independent from each other and may be picked up at the corresponding output couplings, for example, windows A' and B'.

In the embodiment shown in FIG. 3, coaxial couplings A, A' and B, B' have the form of probes or antenna elements, extending at right angles in the guide. Other couplings, such as magnetic couplings may be used, as is well known in the art.

The phase-shifter 6–10 may be a unidirectional phase-shifter of the quantized type, using ferrite remanence: it comprises, as shown in FIG. 4, ferrite or garnet tubes 6.1, 6.2 . . . , with respective axial conductors, associated with pulse generators 10.1, 10.2, etc. The number of such elementary arrangements depends on the elementary phase-shift provided by one element and the total value of the phase-shift desired.

For the sake of clarity, only two phase-shifters are shown in FIG. 4. Of course a single control device 10 may be used for all the elementary phase-shifters.

FIGS. 5 and 6 show in cross-section an example of the ferrite element 6, with a control wire 8 and a dielectric compound 7 which fills the element 6, as is well known in the art.

A ferrite phase-shifting element using an external magnetic field can of course also be used. The ferrite or garnet element 6 will then comprise four plates, forming a square section tube magnetized by an electromagnet.

However, this arrangement is more complicated than the arrangement with coaxial current which is no more bulky than a unidirectional phase-shifter.

For obtaining phase-shifts between 0 and 360°, several assemblies 6–10 of identical construction may be arranged in series, thus providing phase-shifts of 22.5°–45°–90° and 100°, if the desired quantized step is equal to 22.5°.

As in the case of unidirectional phase-shifters it is also possible, if the variations of the control pulse level is sufficiently accurate, to use intermediate remanence states of a single ferrite element, for obtaining the whole desired phase-shift range. This solution is of particular interest, because it avoids any risk of mode coupling by control wires, which may in this case issue from the ends of the phase-shifter, without being anywhere parallel to the electric fields.

The tubes are generally filled with a dielectric 7 as is well known in the art.

In the phase-shifter according to the invention, the whole of the ferrite is used for phase-shifting purposes due to the presence of two crossed fields. Accordingly the peak power acceptable for each wave is the same for the same ferrite element in the case of the bidirectional phase-shifter according to the invention, as in the case of an ordinary unidirectional phase-shifter, since the effective portions of the ferrite, i.e. that parallel to the electric field of the wave, are different for the two propagation directions. The bidirectional phase-shifter is not noticeably more complicated than the unidirectional one.

So far, the insertion phase-shift has been disregarded. This phase-shift may differ for the two directions of propagation. These phase-shifts are constant, and their difference may be easily compensated as known in the art, for example, by using guides or lines of different lengths for the connection of the two channels.

It is obviously possible to use for the couplings B and/or B' the same windows as for the couplings A and A' while providing one or two polarization direction rotators by 90°, or, for making the system more symmetrical, to use on both sides windows of the same type associated with polarization rotators through 45°. However, since the object of the invention is to simplify phase-shifting assemblies, the embodiments described in connection with the figures are generally preferred.

It will also be noted that the couplings B and B' may also be in the form of windows in one of the longitudinal walls of the guide, as shown in FIG. 7. However, this solution results in matching problems which are more intricate than in the case of FIG. 2.

Of course, the invention is not limited to the embodiments hereinbefore described, which have been given merely by way of example.

We claim:

1. A nonreciprocal phase shifter for simultaneously phase shifting by opposite values waves propagating therein in opposite directions respectively in the $TE_{01}$ and in the $TE_{10}$ modes comprising a square waveguide dimensioned for propagating waves of dominant $TE_{01}$ and $TE_{10}$ modes having two end portions and two pairs of opposed lateral walls; at each of said end portions first coupling means for waves polarized normally to one pair of opposed lateral walls of said waveguide and second coupling means for waves polarized normally to the other pair of opposed lateral walls; and controllable, nonreciprocal phase-shifter means inserted in said waveguide.

2. A phase-shifter according to claim 1 for guide propagated wave, wherein said coupling means comprise rectangular guide portions opening into the square waveguide walls.

3. A phase-shifter according to claim 2, wherein said first and second coupling means open respectively into adjacent laterall walls.

4. A phase-shifter according to claim 2, wherein said square waveguide has end walls, said first coupling means open into one of said lateral walls and said second coupling means open into said end walls.

5. A phase-shifter according to claim 1 for coaxial line propagated waves, wherein said coupling means comprise probes penetrating into said square guide.

6. A phase-shifter according to claim 5, wherein said first and second coupling means penetrate into the guide through adjacent lateral walls.

7. A phase-shifter according to claim 5, wherein said square guide has lateral end walls, said first coupling means penetrate into the guide through one of said lateral walls, and said second coupling means penetrate into the guide through said end walls.

References Cited

UNITED STATES PATENTS

| 3,094,676 | 6/1963 | Bowness | 333—1.1 X |
| 3,277,401 | 10/1966 | Stern | 333—24.1 |
| 3,281,851 | 10/1966 | Goebels | 343—768 |

PAUL L. GENSLER, Primary Examiner

U.S. Cl. X.R.

333—24.1